(12) United States Patent
Noda

(10) Patent No.: US 6,193,049 B1
(45) Date of Patent: Feb. 27, 2001

(54) THREE-DIMENSIONAL DRIVING SYSTEM FOR TRANSFER FEEDER OF TRANSFER PRESS

(75) Inventor: Shigekazu Noda, Kamazawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/376,305

(22) Filed: Aug. 18, 1999

(30) Foreign Application Priority Data

Aug. 19, 1998 (JP) .................................................. 10-232715

(51) Int. Cl.[7] .................................................. B65G 37/00
(52) U.S. Cl. ...................... 198/346.2; 198/468.2
(58) Field of Search ............................. 198/339.1, 346.1, 198/346.2, 346.3, 345.1, 373, 375, 376, 468.01, 468.2, 401

(56) References Cited

U.S. PATENT DOCUMENTS

| | | | |
|---|---|---|---|
| 4,964,497 | * | 10/1990 | Bundo et al. ..................... 198/346.2 |
| 5,937,994 | * | 8/1999 | Antoine de Banbuat ......... 198/346.2 |

* cited by examiner

*Primary Examiner*—Kenneth W. Noland
(74) *Attorney, Agent, or Firm*—Varndell & Varndell, PLLC

(57) ABSTRACT

A three-dimensional driving system for a transfer feeder of a transfer press for feeding a work into successive processing stations which is surrounded by a plurality of uprights comprises a feed mechanism linked to a pair of transfer bars arranged parallel to a work feed direction for gripping and transferring the work and a feed mechanism driver linked to the feed mechanism to drive it. The three-dimensional driving system further comprises, a lift mechanism which is provided on a bed surrounded by the uprights and causes the transfer bars to ascend and descend, a clamp mechanism which is linked to the lift mechanism and causes the transfer bars to grip and release the work, a clamp and lift box accommodating the lift mechanism and the clamp mechanism, a lift mechanism driver linked to the lift mechanism to drive it, and a clamp mechanism driver linked to the clamp mechanism to drive it. The lift mechanism driver and the clamp mechanism driver have their own drive shafts and servomotors connected to the lift mechanism and the clamp mechanism, respectively, and are disposed separately from each other in opposite terminal portions of the clamp and lift box.

3 Claims, 5 Drawing Sheets

THREE-DIMENSIONAL DRIVING SYSTEM FOR TRANSFER FEEDER OF TRANSFER PRESS

BACKGROUND OF THE INVENTION

1. Field of the Invention

The present invention relates to a three-dimensional driving system for a transfer feeder of a transfer press for feeding works into successive processing stations that are individually surrounded by a plurality of uprights.

2. Description of the Related Art:

In an automatic press system, a transfer press has conventionally been equipped with a servo-assisted three-dimensional driving system for a transfer feeder that is driven by servomotors. To feed works into processing stations of the transfer press, the three-dimensional driving system comprises a pair of transfer bars arranged parallel to the feed direction of the works, a feed mechanism provided at one end of the transfer bars, and clamp and lift mechanisms provided closer the other end of the transfer bars. As the transfer bars are caused to move in the feed direction by the feed mechanism and to move in lifting and clamping directions by the clamp and lift mechanisms, the transfer bars grip and release each work between themselves to thereby carry the works into and out of dies of successive stages of a press process automatically.

If it is desired to successively feed a series of works from one die location to the next along a line of processing stations for sequential processing, for example, the clamp and lift mechanisms are provided between successive uprights or between the successive die locations of the transfer press, and individual sections of the feed, clamp and lift mechanisms are driven in three-dimensional directions in a controlled manner, so that each work is automatically processed by the transfer press through a sequence of steps.

A related art example of a servo-assisted three-dimensional driving system for a transfer feeder is disclosed in JP-B-2-1 1934U. Since servomotors are directly connected to individual mechanisms including a feed mechanism, clamp mechanisms and lift mechanisms in this servo-assisted three-dimensional driving system, it is possible to move transfer bars at high speeds in a three-dimensional space and thereby achieve an improvement in productivity.

Another example of the related art is a three-dimensional driving system for a mechanical transfer feeder that is driven by motive power supplied from a drive system of a press. This mechanical three-dimensional driving system takes the motive power from the drive system of the press through transmission mechanisms, which include a bevel gear mechanism, pinions and cam shafts. Therefore, when installing a servo-assisted three-dimensional driving system instead of the existing mechanical three-dimensional driving system, an extra installation space that has not been required will become necessary, and mounting sites for individual servomotors will pose a serious problem. Especially when a press process involves many stages and feed lengths of transfer bars are short, the distances between successive uprights become small and, therefore, great limitations will be imposed on the availability of mounting sites for the servomotors.

It is necessary to install individual servomotors so that they would not interfere with the main structure and dies of the transfer press. Furthermore, although large-sized servomotors having a large capacity are required, it is practically impossible to install the large-sized servomotors for reasons stated above. Therefore, it has conventionally been necessary to install a number of small-sized servomotors.

SUMMARY OF THE INVENTION

In the light of the aforementioned problems of the related art, it is an object of the invention to provide a three-dimensional driving system for a transfer feeder which makes it possible to achieve a reduction in installation space required for clamp and lift mechanisms.

In one aspect of the invention, a three-dimensional driving system for a transfer feeder of a transfer press for feeding a work into a processing station which is surrounded by a plurality of uprights comprises a feed mechanism linked to a pair of transfer bars arranged parallel to a work feed direction for gripping the work and transferring it to the aforementioned processing station, a lift mechanism which is provided on a bed surrounded by the uprights and causes the transfer bars to ascend and descend, a clamp mechanism which is linked to the lift mechanism and causes the transfer bars to grip and release the work, a clamp and lift box accommodating the lift mechanism and the clamp mechanism, a feed mechanism driver linked to the feed mechanism to drive it, a lift mechanism driver linked to the lift mechanism to drive it, and a clamp mechanism driver linked to the clamp mechanism to drive it, wherein the lift mechanism driver and the clamp mechanism driver have their own drive shafts and servomotors connected to the lift mechanism and the clamp mechanism, respectively, and are disposed separately from each other in opposite terminal portions of the clamp and lift box.

This construction of the three-dimensional driving system for the transfer feeder makes it possible to provide the individual drivers, including the servomotors and the drive shafts, separately from one another and, more particularly, they can be installed in the clamp mechanism and the lift mechanism disposed in the opposite terminal portions of the clamp and lift box. Since the servomotors and the drive shafts of both the clamp and lift mechanisms are so configured as to operate in synchronism with each other, loads applied to the individual servomotors are reduced and necessary motive power can be obtained by using servomotors having a lower capacity. Further, as a result of a reduction in physical size, it becomes possible to accommodate the servomotors and other elements of the driving system in limited spaces.

In another aspect of the invention, the bed surrounded by the uprights has an opening and the clamp mechanism driver and the lift mechanism driver are accommodated in the opening.

This construction allows space for installing the servomotors and the drive shafts inside the opening formed in the bed, in addition to achieving the effects of the aforementioned construction according to the first aspect of the invention. As a consequence, it is possible to create large spaces inside the main structure of the transfer press and in the vicinity of dies and achieve an improvement in maintainability and a reduction in acoustic noise.

In a still another aspect of the invention, the drive shafts of the lift mechanism driver and the clamp mechanism driver are fitted in through holes formed in the bed, the servomotors of the lift mechanism driver and the clamp mechanism driver are installed in accommodating spaces formed in a lower portion of the bed, and the drive shafts are linked to their corresponding servomotors.

Since the drive shafts fitted in the through holes in the bed can be linked to the respective servomotors installed in the accommodating spaces formed in the lower portion of the bed in this construction, it is possible to efficiently use installation spaces for the lift and clamp mechanisms and thereby achieve further space savings. Furthermore, the lift and clamp mechanisms can be combined into a single unit. This makes it possible to reduce overall costs and factory areas required for installing an automatic press system.

DESCRIPTION OF THE PREFERRED EMBODIMENT

Figure 1:
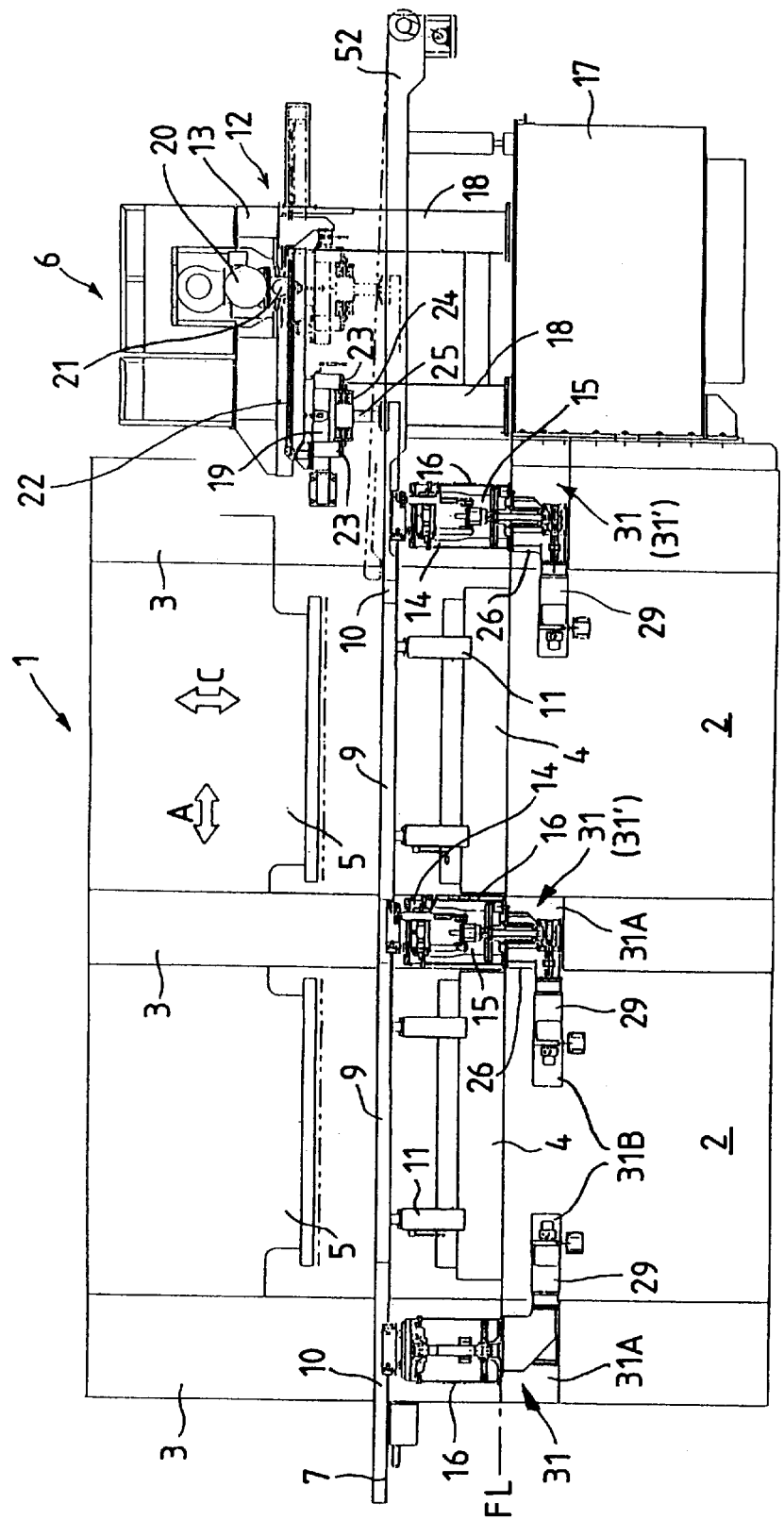
FIG. 1 is a front elevation showing a three-dimensional driving system for a transfer feeder of a transfer press according to the invention.
Figure 2:
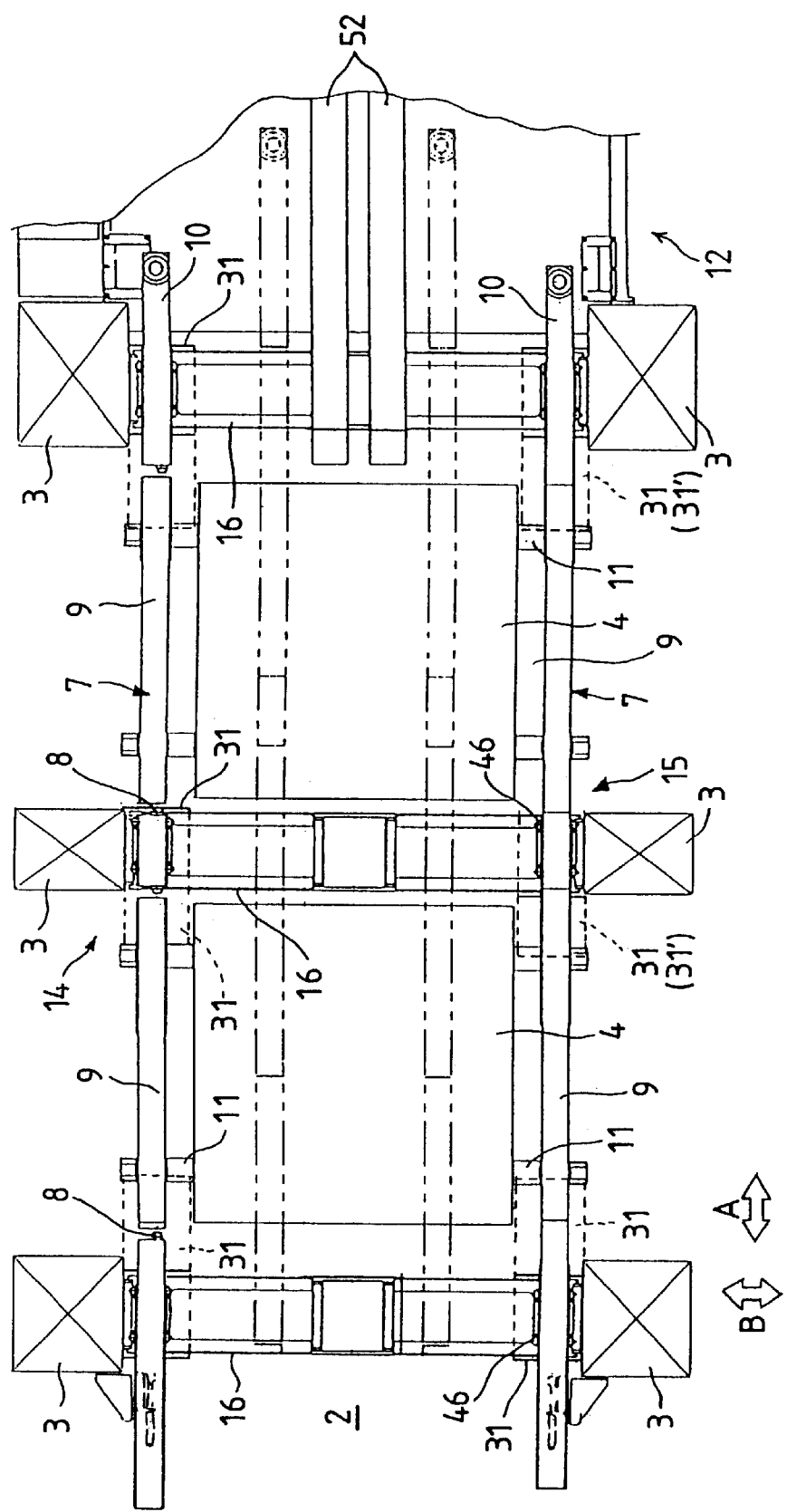
FIG. 2 is a partially cutaway plan view of the three-dimensional driving system.
Figure 3:
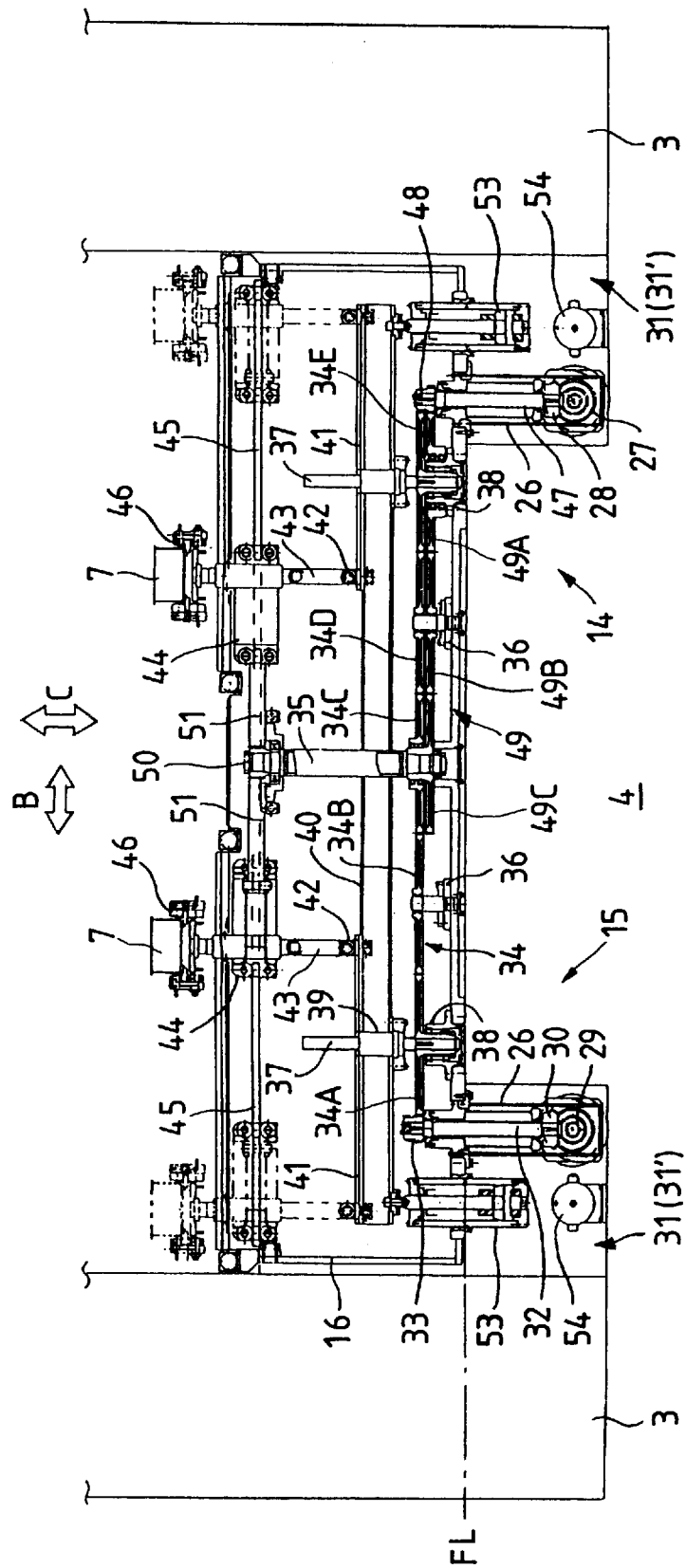
FIG. 3 is a side view showing clamp and lift mechanisms of the three-dimensional driving system.

A preferred embodiment of the invention is now described, by way of example, with reference to the accompanying drawings, in which FIG. 1 is a front elevation showing a three-dimensional driving system for a transfer feeder of a transfer press according to the invention, FIG. 2 is a partially cutaway plan view of the three-dimensional driving system of the invention, and FIG. 3 is an explanatory diagram showing clamp and lift mechanisms of the three-dimensional driving system of the invention.

In FIGS. 1 to 3, the numeral 1 designates the transfer press and the numeral 2 designates a bed installed below the level of a floor FL. Each of the three uprights 3 is provided above the bed 2 on both sides (front and rear) along a work feed direction A as illustrated. Two moving bolsters 4 are movably provided on the bed 2 and a plurality of lower dies (not shown) are mounted on top of the moving bolsters 4 at equal intervals. Mounted above the moving bolsters 4 are two slides 5 which are made ascendable and descendable between the successive uprights 3 by driving mechanisms provided in crowns (not shown). A plurality of upper dies (not shown) are attached to the slides 5 in one-to-one correspondence with the lower dies mounted on the moving bolsters 4. When replacing the dies, the individual moving bolsters 4 can be drawn out, with the upper and lower dies mounted on them, from between the uprights 3. Although not illustrated, the moving bolsters 4 are mounted on wheels and can travel on rails.

The transfer press 1 is equipped with the three-dimensional driving system 6 for the transfer feeder. The three-dimensional driving system 6 has a pair of transfer bar assemblies 7 which are arranged parallel to each other between front and rear rows of the uprights 3. The individual transfer bar assemblies 7 are fitted with a plurality of fingers (not shown) and can move works (not shown) gripped by the fingers to positions in a three-dimensional space. Each of the transfer bar assemblies 7 is constructed of two each central bars 9 and end bars 10 that are detachably joined together by connectors 8 as shown in FIG. 2. When replacing the dies or fingers, the central bars 9 can be drawn out together with the upper and lower dies from between the uprights 3, positioned on bar supports 11 that are provided on the moving bolsters 4.

Referring to FIG. 1, a feed mechanism 12 and a feed box 13 are provided at one end of the transfer bar assemblies 7 while clamp and lift boxes 16, each incorporating a clamp mechanism 14 and a lift mechanism 15, are provided closer at the other end of the transfer bar assemblies 7. The feed box 13 is mounted on vertical supports 18 which are erected on a mounting base 17 below the floor FL, and a feed carrier 19 is suspended inside the feed box 13. The feed box 13 also incorporates a feed servomotor 20 which is connected to a pair of feed pinions 21 located on both sides (front and rear) with respect to the work feed direction A via a power transmission mechanism formed of a reducer, a spline shaft, etc., which are not illustrated. The feed pinions 21 mesh with a pair of feed racks 22 fixed to an upper part of the feed carrier 19, so that the feed carrier 19 can be moved parallel to the work feed direction A. There are provided a pair of parallel guide rails 23, running at right angles to the work feed direction A in which the feed racks 22 are aligned, at a lower part of the feed carrier 19; and a pair of feed sub-carriers 24 are provided in such a way that they can travel along the guide rails 23. Guide posts 25 are attached to lower parts of the feed sub-carriers 24 and the transfer bar assemblies 7 are guided up and down by these guide posts 25. In a varied form of the above-described construction, the feed box 13 may be directly mounted to end surfaces of the rightmost uprights 3 of FIG. 1.

The clamp and lift boxes 16, each incorporating the clamp mechanism 14 and the lift mechanism 15, are provided on the bed 2 between the paired (front and rear) uprights 3. The clamp mechanism 14 and the lift mechanism 15 are two separate power transmission mechanisms. There are provided two clamp and lift sub-units 26 in opposite terminal portions of each clamp and lift box 16 as shown in FIG. 3. One of these clamp and lift sub-units 26 accommodates a drive shaft 47 associated with a clamping servomotor 27 and a bevel gear 28 as one driver while the other accommodates a drive shaft 32 associated with a lifting servomotor 29 and a bevel gear 30 as another driver. These clamp and lift sub-units 26 provided in the opposite terminal portions (front and rear) of each clamp and lift box 16 are accommodated in openings 31 in the bed 2.

The openings 31 shown above as a first practical example of implementation of the invention are pits, through holes or cutouts that are formed in the bed 2 immediately beneath the clamp and lift boxes 16 and serve as spaces for housing the sub-units 26. Referring to FIGS. 1 to 3, the drive shafts 32 of the individual lift mechanisms 15 and the drive shafts 47 of the individual clamp mechanisms 14 are inserted into shaft holes 31' in the openings 31, and the servomotors 29, 27 of the lift mechanisms 15 and the clamp mechanisms 14 are accommodated at the bottoms of the respective shaft holes 31'. As can be seen from FIGS. 1 and 3, each of the openings 31 is formed of a vertical hole (shaft-accommodating space) 31A extending downward in a straight line from a portion of the bed 2 between each pair of front and rear uprights 3 which are aligned in a direction B perpendicular to the work feed direction A and an elongate horizontal cavity (servomotor-accommodating space) 31B extending horizontally in the same plane from the bottom of the vertical hole 31A. The horizontal cavities 31B thus formed close to the lower parts of the uprights 3 individually accommodate the servomotor 27, 29 while the vertical holes 31A individually accommodate the drive shafts 32, 47 associated with the bevel gears 28, 30.

Figure 4:
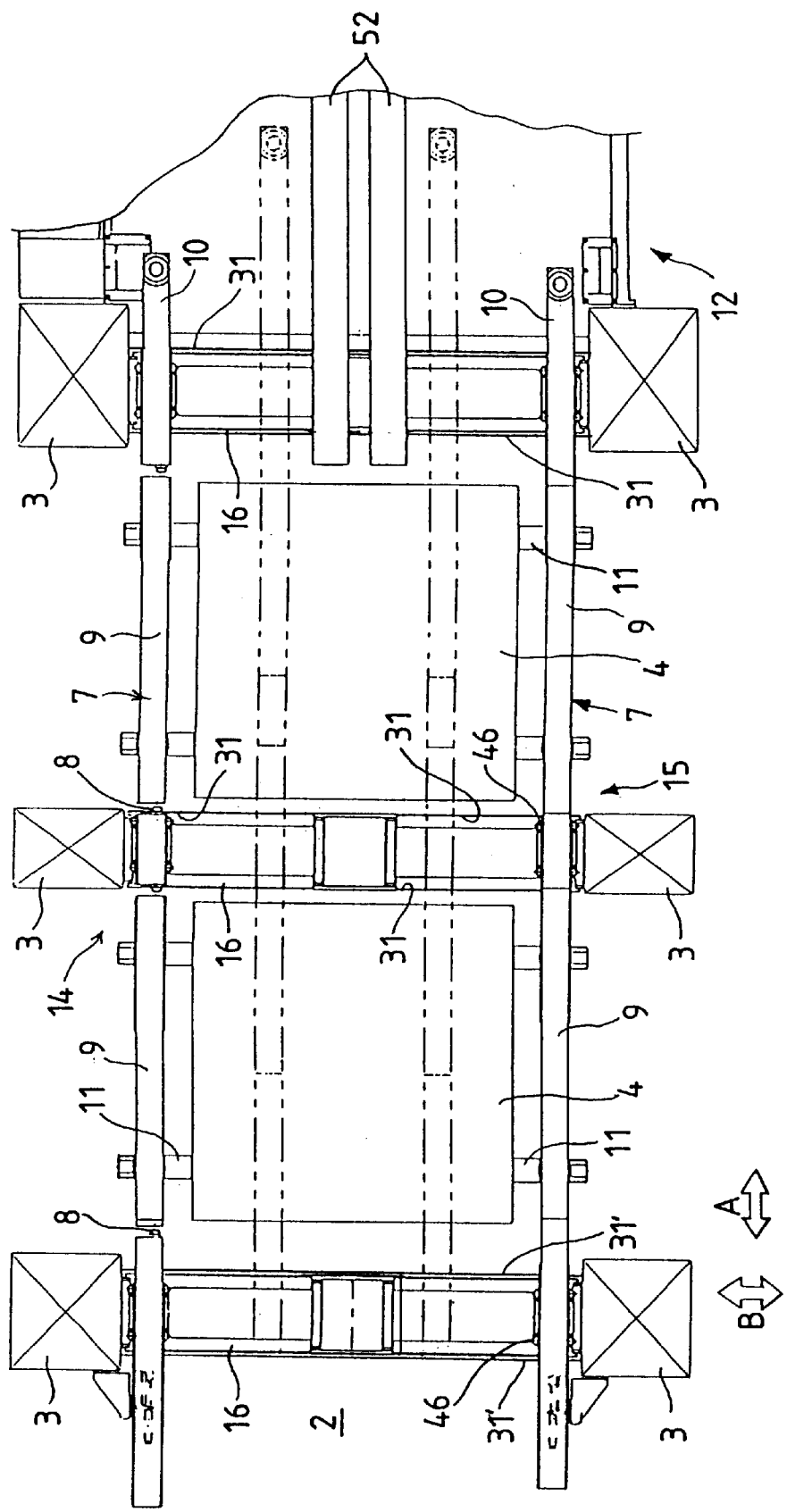
FIG. 4 is a partially cutaway plan view especially showing one form of openings made in a bed of the transfer feeder for accommodating clamp and lift boxes.

Referring to FIG. 4, there are shown openings 31 as a second practical example of implementation of the invention. These openings 31 are elongate channels formed between the front and rear uprights 3 along a longitudinal direction of the individual clamp and lift boxes 16. Each of the openings 31 has shaft-accommodating spaces into which the drive shafts 32, 47 are inserted and servomotor-accommodating spaces formed at the bottoms of the shaft-accommodating spaces to accommodate the individual servomotor 29, 27.

With the provision of the aforementioned openings 31 in the bed 2 as shown in FIGS. 1–4, it is possible to create large spaces inside the main structure of the transfer press 1 and in the vicinity of the dies and achieve an improvement in maintainability and a reduction in acoustic noise. It is also possible to efficiently use available installation space for the clamp and lift mechanisms 14, 15 and thereby achieve space savings.

Figure 5:
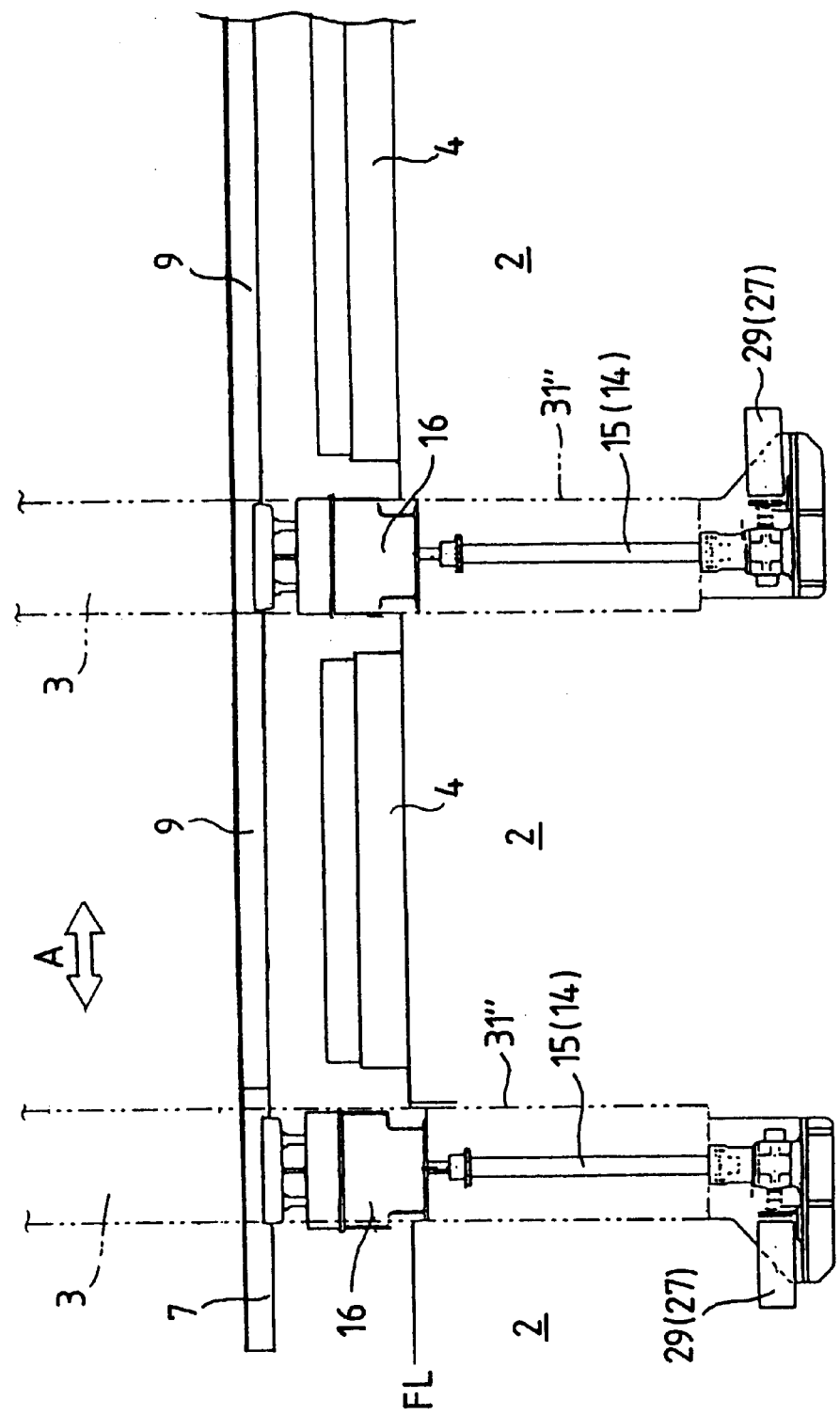
FIG. 5 is a partially cutaway front elevation especially showing another form of openings made in the bed of the transfer feeder for accommodating the clamp and lift boxes.

Referring now to FIG. 5, there are shown openings 31 as a third practical example of implementation of the invention, in which through holes 31" are formed in the bed 2 immediately beneath the drive shafts 32, 47 between each pair of front and rear uprights 3. The drive shafts 32, 47 are inserted in these through holes 31" while the servomotors 29, 27 are installed in accommodating spaces formed in lower portions of the bed 2, the drive shafts 32, 47 being connected to their corresponding servomotors 29, 27. According to this third practical example, it is possible to achieve further space savings by using available installation space for the clamp and lift mechanisms 14, 15 even more efficiently and the clamp and lift mechanisms 14, 15 of each stage can be combined into a single unit. Consequently, it is possible to reduce overall costs and factory areas required for installing an automatic press system.

The lifting servomotors 29 are connected to the bevel gears 30. Each drive shaft 32 that has the bevel gear 30 projects upward from a bottom surface of the pertinent clamp and lift box 16. A lift pinion 33 fixed to each drive shaft 32 meshes a gear 34A of a gear-operated interlock mechanism 34 which is installed along the longitudinal direction of the clamp and lift box 16. The gear-operated interlock mechanism 34 includes five gears designated 34A, 34B, 34C, 34D and 34E. The gear 34C located at a central position is rotatably connected to an output shaft 35 of the pertinent clamp mechanism 14 without interlocking with each other, and the gears 34B and 34D are rotatably supported by respective bearings 36. The gears 34A and 34E located at both ends of the gear-operated interlock mechanism 34 are individually connected to ball screws 37. These ball screws 37 are rotatably supported by respective bearings 38, and ball nuts 39 screwed on the respective ball screws 37 are fixed to a lift beam 40. The lift beam 40 is made ascendable and descendable, with guide rails 41 formed at both upper terminal portions of the lift beam 40. Lower clamp carriers 42 of the clamp mechanism 14 are movably supported by these guide rails 41 and connected to upper clamp carriers 44 via respective guide posts 43. The upper clamp carriers 44 are movably supported by guide rails 45 provided on the clamp and lift box 16 and top parts of the guide posts 43, which are made vertically movable and connected to the respective upper clamp carriers 44, support the transfer bar assemblies 7 via rollers 46.

Rotary motion of each clamping servomotor 27 is transmitted to its corresponding bevel gear 28. As previously described, each clamping servomotor 27 is accommodated in its corresponding horizontal cavity 31B and the bevel gear 28 is housed in the relevant vertical hole 31A. The drive shaft 47 fitted with the bevel gear 28 projects upward from the bottom surface of the pertinent clamp and lift box 16 and a pinion 48 is fixed to an upper end of the drive shaft 47. A gear-operated interlock mechanism 49 is installed along the longitudinal direction of each clamp and lift box 16 parallel to the gears 34C, 34D and 34E of the gear-operated interlock mechanism 34 in such a way that the gear-operated interlock mechanism 34 and the gear-operated interlock mechanism 49 operate in synchronism with each other.

The gear-operated interlock mechanism 49 is constructed of three gears 49A, 49B, 49C which are engaged with one another. The gear 49A is rotatably fitted into the bearing 38 of one ball screw 37 and the pinion 48 is engaged with the gear 49A. The gear 49C is engaged with the gear 49A by way of the gear 49B that is rotatably supported by one of the bearings 36. The gear 49C located at a central position is fixed to the output shaft 35 of the pertinent clamp mechanism 14. The output shaft 35 of the clamp mechanism 14 is rotatably supported on the clamp and lift box 16, and two clamp racks 51 fitted to project from offset positions on facing surfaces of the upper clamp carriers 44 supported by the front and rear guide rails 45 are engaged with a pinion 50 mounted at an output end of the output shaft 35. With this arrangement, the output shaft 35 of the clamp mechanism 14 causes the individual upper clamp carriers 44 to reciprocate such that they are brought closer to and separated from each other. In FIG. 3, designated by the numeral 53 are balancing cylinders and designated by the numeral 54 are air tanks.

Due to the above-described construction, it is possible to properly distribute driving means for the individual servomotors 27, 29 and drive shafts 47, 32 and, more particularly, the driving means can be distributed at opposites ends of the clamp and lift mechanisms 14, 15. Since individual portions of the driving means operate in synchronism with each other in this construction, loads applied to the individual servomotors 27, 29 are reduced so that necessary motive power can be obtained by using servomotors having a lower capacity. It is also possible to combine each pair of clamp and lift mechanisms 14, 15 into a single unit. Furthermore, the individual servomotors 27, 29 and associated drive mechanisms can be installed in limited spaces.

Operation of the three-dimensional driving system 6 for the transfer feeder of the invention is now described referring to FIGS. 1 to 3.

When a work (not shown) to be processed is brought into processing stations of the transfer press 1 of FIG. 1 from left to right as illustrated, the clamping servomotors 27 are caused to turn in their forward running direction by a command from non-illustrated control means. Then, the drive shaft 47 fitted with the bevel gear 28 is rotated and the pinion 48 fixed to the drive shaft 47 cause the individual gears 49A–49C of the gear-operated interlock mechanism 49 to rotate as shown in FIG. 3. As a result, the output shaft 35 rotatably meshed with the gear 49A rotates and moves the clamp racks 51 that are fitted to project from offset positions on the facing surfaces of the upper clamp carriers 44, so that the upper clamp carriers 44 come closer to each other along the guide rails 45. At the same time, the lower clamp carriers 42 linked to the upper clamp carriers 44 via the guide posts 43 move along the guide rails 41 of the clamp and lift box 16 and the feed sub-carriers 24 travel along the guide rails 23. Then, the transfer bar assemblies 7 held by the rollers 46 of the guide posts 43 at the respective upper clamp carriers 44 move in clamping directions and the work is gripped between the fingers attached to the transfer bar assemblies 7.

When the above-described work clamping operation has been completed, the lifting servomotors 29 are caused to turn in their forward running direction by a command from the non-illustrated control means. Then, the drive shaft 32 fitted with the bevel gear 30 is rotated and the lift pinion 33 fixed to the drive shaft 32 cause the individual gears 34A to 34E of the gear-operated interlock mechanism 34 to rotate as shown in FIG. 3. The ball screws 37 rotatably meshed with the gears 34A and 34E are rotated simultaneously and the lift beam 40 connected to the ball screws 37 via the ball nuts 39 is lifted in the direction of arrow C. At this time, the lower clamp carriers 42 provided on the lift beam 40 ascend along the guide posts 43 and, as a consequence, the transfer bar assemblies 7 held by the rollers 46 of the guide posts 43 at the respective upper clamp carriers 44 are smoothly lifted up to a specified height.

When the above-described work lifting operation has been completed, the feed servomotor 20 is caused to turn in its forward running direction by a command from the non-illustrated control means. Then, the feed pinions 21 are rotated via the power transmission mechanism and, as the feed carrier 19 is moved rightward (as illustrated in FIG. 1) along non-illustrated guide rails by the feed racks 22, the transfer bar assemblies 7 cause the rollers 46 of the guide posts 43 at the respective upper clamp carriers 44 to rotate so that the transfer bar assemblies 7 move rightward, as shown in FIG. 1. When the individual transfer bar assemblies 7 reach specified positions, the feed servomotor 20 stops and the lifting servomotor 29 begins to turn in its reversing direction, causing the transfer bar assemblies 7 to descend. Then, the clamping servomotor 27 is caused to turn in its reversing direction so that the individual transfer bar assemblies 7 are moved away from each other, and the work (not shown) gripped between the fingers attached to the transfer bar assemblies 7 is released into a desired die. Subsequently, the feed servomotor 20 turns in its reversing direction, causing the individual transfer bar assemblies 7 to move leftward (as illustrated in FIG. 1) and return to their home positions where they grasped the work. The individual mechanisms of the transfer press 1 repetitively make the above-described three-dimensional movements to transfer each successive work from one processing station to the next. The work that has gone through all stages of a press process at the successive processing stations is ejected from the transfer press 1 by an output conveyor 52.

When it is necessary to replace any of the dies or fingers, the central bars 9 of the individual transfer bar assemblies 7 are first disconnected and, with the central bars 9 placed on the bar supports 11 provided on the pertinent moving bolsters 4, the dies or fingers to be replaced are taken out together with the moving bolsters 4 from between the uprights 3.

As can be recognized from the foregoing discussion, the individual driving means of the clamp mechanism 14 and the lift mechanism 15 are separated into two groups and provided in the opposite terminal portions (front and rear) of the clamp and lift box 16 of each processing station and they operate in synchronism with each other in the three-dimensional driving system 6 for the transfer feeder of the transfer press 1 of the invention. Thus, loads applied to the individual servomotors 27, 29 are reduced and necessary motive power can be obtained by using servomotors having a lower capacity.

In addition, the aforementioned construction allows space for 2 of the transfer press 1 and, therefore, it is possible to create large spaces in the vicinity of the dies and achieve an improvement in maintainability and a reduction in acoustic noise. Furthermore, it is possible to minimize the spaces for installing the servomotors 27, 29 and drive shafts 47, 32 and achieve further space savings through efficient use of installation spaces for the clamp mechanism 14 and the lift mechanism 15. Moreover, the clamp mechanism 14 and the lift mechanism 15 of each stage can be combined into a single unit and installed between the dies of the successive processing stations, and a series of such units can be controlled individually. This makes it possible to reduce overall costs and factory areas required for installing an automatic press system.

Furthermore, in the present invention, it is not necessary to provide a clamp mechanism 14 and a lift mechanism 15 for each upright 3. For example, if there are five pairs of uprights (first, second, third, fourth and fifth pairs of uprights 13), three sets of a clamp mechanism 14 and a lift mechanism 15 are sufficient to move the work piece between the processing stations. In this situation a clamp mechanism 14 and a lift mechanism 15 can be provided at the first, third and fifth pair of uprights 3, and no clamp mechanism 14 and a lift mechanism 15 need be provided at the second and fourth pair of uprights. In this arrangement the transfer bar assemblies 7 and associated structure are constructed of sufficient length or with sufficient capabilities, so that the work could be move through all stages of a press process including those in front of and behind the second and fourth uprights.

While the invention has been described with reference to its preferred embodiment, the foregoing discussion has revealed some typical examples of implementation of the invention. It should be understood that various changes and variations of these examples are possible within the scope of the following claims.

What is claimed is:

1. A three-dimensional driving system for a transfer feeder of a transfer press for feeding a work into a processing station which is surrounded by a plurality of uprights, said three-dimensional driving system comprising:

a feed mechanism linked to a pair of transfer bars arranged parallel to a work feed direction for gripping the work and transferring it to said processing station;

a lift mechanism which is provided on a bed surrounded by said uprights and causes said transfer bars to ascend and descend;

a clamp mechanism which is linked to said lift mechanism and causes said transfer bars to grip and release the work;

a clamp and lift box accommodating said lift mechanism and said clamp mechanism;

a feed mechanism driver linked to said feed mechanism to drive it;

a lift mechanism driver linked to said lift mechanism to drive it; and a clamp mechanism driver linked to said clamp mechanism to drive it;

wherein said lift mechanism driver and said clamp mechanism driver have their own drive shafts and servomotors connected to said lift mechanism and said clamp mechanism, respectively, and are disposed separately from each other in opposite terminal portions of said clamp and lift box.

2. A three-dimensional driving system for the transfer feeder as claimed in claim 1, wherein said bed surrounded by said uprights has an opening and said clamp mechanism driver and said lift mechanism driver are accommodated in said opening.

3. A three-dimensional driving system for the transfer feeder as claimed in claim 1, wherein the drive shafts of said lift mechanism driver and said clamp mechanism driver are fitted in through holes formed in said bed, the servomotors of said lift mechanism driver and said clamp mechanism driver are installed in accommodating spaces formed in a lower portion of said bed, and said drive shafts are linked to their corresponding servomotors.

* * * * *